(12) United States Patent
Baert et al.

(10) Patent No.: US 9,068,709 B2
(45) Date of Patent: Jun. 30, 2015

(54) OPTICAL UNIT FOR SIGNALING AND/OR LIGHTING DEVICE

(75) Inventors: Christophe Baert, Montreuil Juigne (FR); Sébastien Denis, Angers (FR); Xavier Soenen, Vauchretien (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 13/979,772

(22) PCT Filed: Jan. 17, 2012

(86) PCT No.: PCT/EP2012/050651
§ 371 (c)(1),
(2), (4) Date: Aug. 13, 2013

(87) PCT Pub. No.: WO2012/098123
PCT Pub. Date: Jul. 26, 2012

(65) Prior Publication Data
US 2013/0322104 A1    Dec. 5, 2013

(30) Foreign Application Priority Data

Jan. 18, 2011    (FR) ...................................... 11 50375

(51) Int. Cl.
*F21V 9/00*    (2006.01)
*F21S 8/10*    (2006.01)
*G02B 6/42*    (2006.01)

(52) U.S. Cl.
CPC ............ *F21S 48/00* (2013.01); *Y10T 29/49128* (2015.01); *G02B 6/4292* (2013.01); *G02B 6/4298* (2013.01); *F21S 48/212* (2013.01); *F21S 48/215* (2013.01); *F21S 48/2237* (2013.01); *F21S 48/2268* (2013.01); *F21S 48/2287* (2013.01)

(58) Field of Classification Search
CPC ...... F21S 48/00; G02B 6/4292; G02B 6/4298
USPC .................................. 362/551, 555, 511, 396
See application file for complete search history.

(56) References Cited

U.S. PATENT DOCUMENTS

| | | | | |
|---|---|---|---|---|
| 4,195,330 A * | 3/1980 | Savage, Jr. ..................... 362/655 |
| 5,440,468 A * | 8/1995 | Savage, Jr. ..................... 362/655 |
| 6,302,595 B1 * | 10/2001 | Vilgiate et al. .................. 385/88 |
| 6,527,411 B1 * | 3/2003 | Sayers ........................... 362/245 |
| 6,779,929 B1 * | 8/2004 | Savage, Jr. ...................... 385/92 |
| 7,942,563 B2 | 5/2011 | Gingrich, III et al. |
| 8,636,423 B2 * | 1/2014 | Hsu ................. 385/77 |
| 2007/0250006 A1 * | 10/2007 | Court et al. .................... 604/117 |
| 2009/0219732 A1 * | 9/2009 | Gingrich et al. .............. 362/555 |
| 2011/0117320 A1 | 5/2011 | Wolff et al. |

FOREIGN PATENT DOCUMENTS

EP    1780463    5/2007

* cited by examiner

*Primary Examiner* — Ali Alavi
(74) *Attorney, Agent, or Firm* — Jacox, Meckstroth & Jenkins

(57) ABSTRACT

The invention relates to an optical unit, notably for a motor vehicle signaling and/or lighting device, comprising:
 at least one light source, notably an LED,
 at least one board bearing the light source, this board comprising an electric circuit to power the light source,
 a light guide made at least partially from a material through which light can travel, this guide being designed to accept light from the light source and to guide this light,
 the optical unit being characterized in that the board is borne by the light guide.

20 Claims, 3 Drawing Sheets

OPTICAL UNIT FOR SIGNALING AND/OR LIGHTING DEVICE

CROSS-REFERENCE TO RELATED APPLICATIONS

This application claims priority to PCT Application No. PCT/EP2012/050651 filed Jan. 17, 2012 and French Application No. 1150375 filed Jan. 18, 2011, which are incorporated herein by reference and made a part hereof.

FIELD OF THE INVENTION

The invention relates notably to an optical unit for a motor vehicle signaling and/or lighting device.

DESCRIPTION OF THE RELATED ART

In the field of motor vehicle lighting and signaling, it is becoming increasingly commonplace for use to be made of optical waveguides. An optical waveguide is, for example, very schematically speaking, an elongate element of transparent material, generally having a cylindrical-type cross section. Near one of the ends of the guide, referred to as the input face of the guide, there is or are one or more light sources, for example a small-sized light source of the light-emitting diode type: the rays of light emitted by the source travel by total reflection along the length of the guide toward its opposite end referred to as the terminal face of the guide. Some of the rays of light traveling along the guide will emerge from the guide via the face referred to as the front face of the guide because of the presence of reflective elements arranged along the face, opposite the previous face, referred to as the rear face of the guide. These reflective elements consist for example of prisms. The guide thus emits light along its entire length. It has the advantage of being able to adopt very varied geometric shapes, of being straight or curved, and of conveying a lighting surface even to somewhat inaccessible regions of the vehicle light or headlamp. It thus makes a substantial contribution to the style of the light or headlamp.

Such lighting device with an optical waveguide for a motor vehicle is known for example from patent application EP 1 780 463.

What is needed, therefore, is a lighting device that improves upon the prior art.

SUMMARY OF THE INVENTION

It is an object of the present invention to improve this type of device.

Thus, one subject of the invention is an optical unit, notably for a motor vehicle signaling and/or lighting device, comprising:
  at least one light source, notably an LED,
  at least one board bearing the light source, this board comprising an electric circuit to power the light source,
  a light guide made at least partially from a material through which light can travel, this guide being designed to accept light from the light source and to guide this light,
  the wherein the at least one board is borne directly or indirectly by the light guide.

By virtue of the invention, it is possible to position the light source precisely with respect to the light guide, making it possible to inject the maximum amount of light into this guide.

For preference, to make assembly operations easier, the board is Secured, directly or indirectly, to the light guide by clip-fastening.

In one embodiment of the invention, the optical unit comprises a hood fixed, preferably by clip-fastening, to the light guide and designed to accept the board.

If appropriate, the hood is designed to be fixed to the board by clip-fastening.

For example, the hood comprises at least one clip-fastening tab, notably at least two clip-fastening tabs, notably facing one another.

To allow the light source to be positioned even more precisely with respect to the light guide and to make the operations of fitting it easier, the hood comprises at least one positioning tab for the board, preferably at least two positioning tabs notably facing one another.

In one embodiment of the invention, the hood comprises at least one slot designed to accept one edge of the board. This allows the board to be positioned and held in position.

The board may, if appropriate, bear an electrical connector connected to the electric circuit of the board, and the hood advantageously comprises a housing designed to accept this connector, at least partially.

For preference, the hood is designed to prevent light from the light guide and/or from the light source from leaking to the outside.

These leaks of light are perceived to be esthetically unattractive features of the headlamp or of the vehicle and are therefore undesirable.

Advantageously, the hood comprises a barrel at least partially surrounding an end portion of the light guide, the barrel making it possible to prevent light from leaking to the outside.

In one embodiment of the invention, the barrel of the hood surrounds the light source.

For example, the light guide comprises a main body of elongate shape along a predetermined curvilinear axis, and a tab running transversely to this predetermined direction, and connected to this body.

For preference, the hood comprises a cavity designed to accept at least an end portion of the transverse tab of the light guide.

In one embodiment of the invention, the hood comprises at least one clip-fastening tab designed to collaborate with the transverse tab of the light guide, this clip-fastening tab being notably parallel to the aforementioned barrel.

The barrel may have a slot for the passage of the transverse tab of the light guide.

If desired, the hood is made as a single piece.

Advantageously, the light guide is made as a single piece, including the transverse tab, which tab notably corresponds to an injection tab.

Of course other configurations are possible.

In one embodiment of the invention, the light guide comprises two longitudinal ends and each of these ends accepts a light source and a board, and possibly a hood as aforementioned.

The board bearing the light source is notably a printed circuit board.

Another subject of the invention is a lighting and/or signaling device, notably for a motor vehicle, comprising an optical unit as defined hereinabove.

This device may for example be designed to contribute to a legally-required signaling function, notably a DRL (daytime running light) function or a town beam function.

A further subject of the invention is a method for fixing a light source to a light guide in a motor vehicle lighting and/or signaling device, this method involving the following steps:

fixing the light source to a printed circuit board,
fixing the printed circuit board directly or indirectly to one end of the light guide.
The method may involve the following step:
interposing a hood between the light guide and the board.

BRIEF DESCRIPTION OF THE
ACCOMPANYING DRAWINGS

The invention may be better understood from reading the following detailed description of one nonlimiting exemplary embodiment of the invention and from studying the attached drawing in which.

DETAILED DESCRIPTION OF THE PREFERRED
EMBODIMENTS

FIGS. 1 to 3 and 6 depict an optical unit 1 for a motor vehicle signaling and/or lighting device which comprises:
a light source formed with an LED 2 (visible in FIG. 6),
a board 3, which is flat overall, bearing the light source 2, this board 3 comprising an electric circuit (not depicted) for powering the light source 2,
a light guide 5 made at least partially from a material through which light can travel, this guide being designed to receive light from the light source 2 and to guide this light.

The board 3 is borne by the light guide 5, namely for example during a handling operation (notably on a production line), it is possible to take hold of the light guide with the board remaining secured to this light guide, preferably via a hood described later on.

In the example being considered here, the light guide 5 has a cross section of substantially circular shape.

Of course it may also, in other embodiments, have an elliptical, square, oval or even more complicated cross section, and this light guide 5 is based on a transparent polymer made of polycarbonate (or polymethylmethacrylate PMMA, or other suitable polymer).

Figure 5:
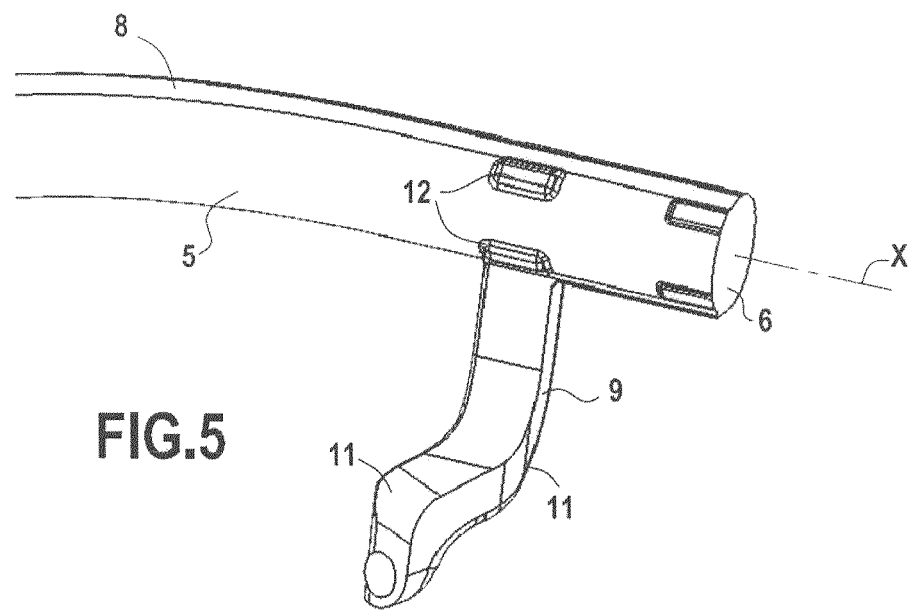
FIG. 5 is a schematic and partial depiction of the light guide of the optical unit of FIGS. 1 to 4 by itself.

The light guide 5 comprises a main body 8 of curved elongate shape along a predetermined curvilinear axis X, and a tab 9 running transversely to this predetermined direction X (as can be seen in FIG. 5).

As an alternative, the body 8 of the light guide may be of rectilinear shape.

In the example described, the tab 9 has a shape with two bends 11. This tab 9 acts as an injection tab.

As can be seen in FIG. 5, the body 8 of the light guide 5 also has positioning bosses 12 for positioning a hood that is described later on.

Figure 4:
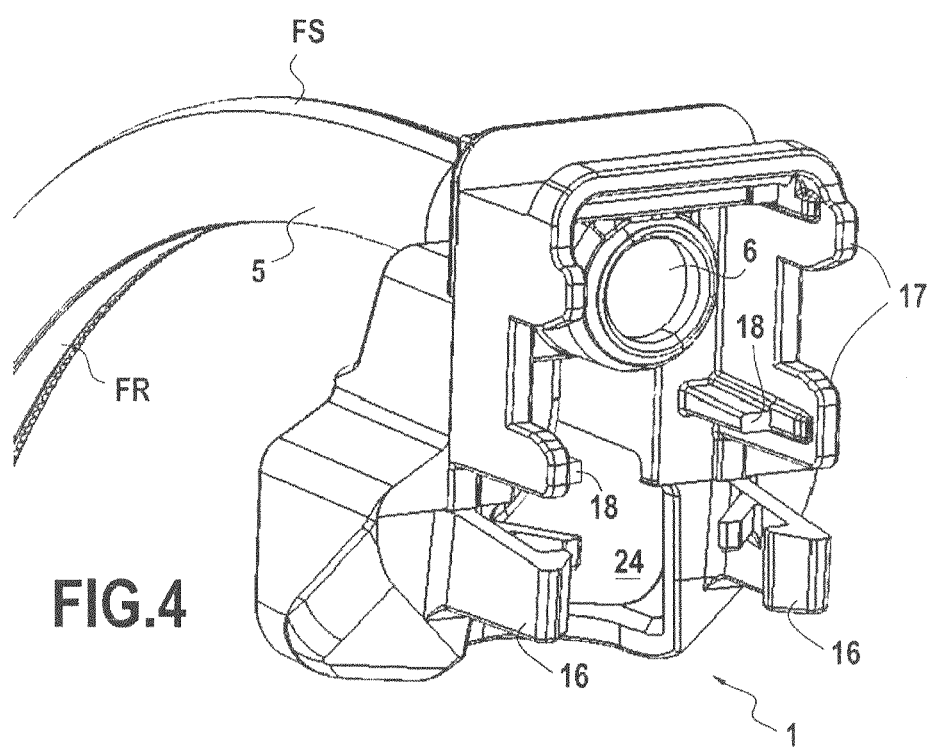
FIG. 4 is a schematic and partial perspective depiction of the optical unit of FIGS. 1 to 3, without the printed circuit board.
Figure 6:
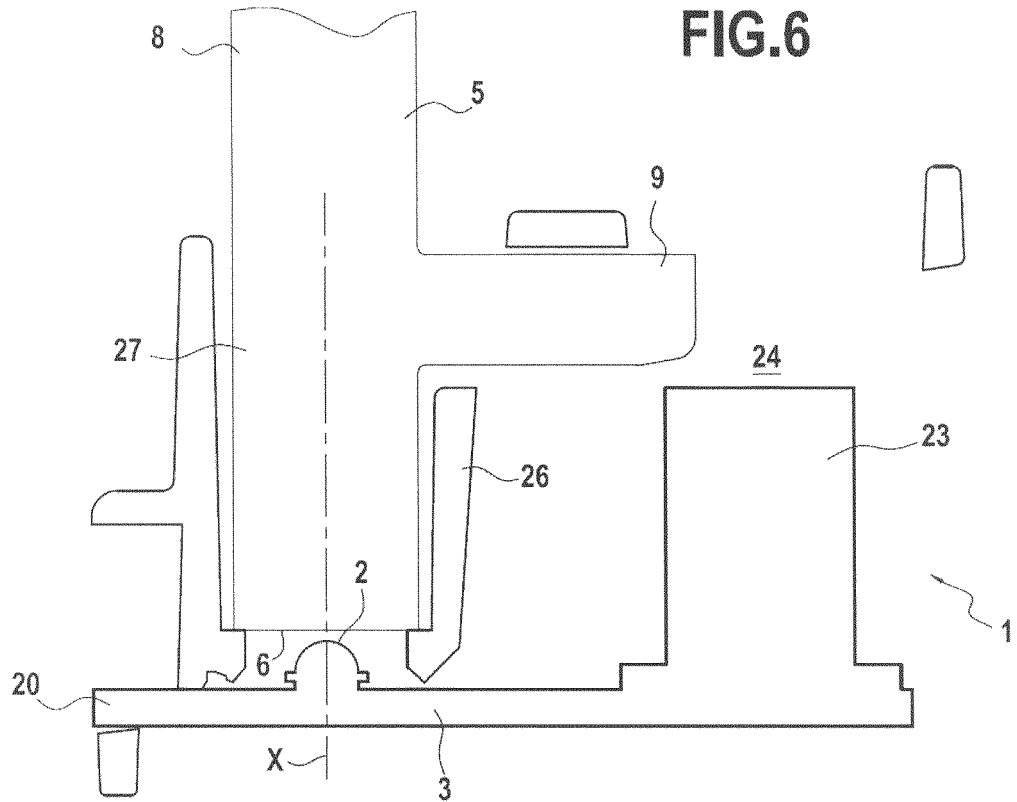
FIG. 6 is a schematic and partial cross section through the optical unit of FIGS. 1 to 4.

As illustrated in FIGS. 4 to 6, the light guide 5 comprises a light input facet 6 at one of the ends of the body 8, and the light-emitting diode 2 is positioned facing this.

The body 8 of the light guide may possibly have another end facet, opposite the facet 6, with another LED positioned facing it.

The light guide 5 further comprises two main faces oriented along the length thereof along the curvilinear axis X:
a first face FS which is an output face for the rays of light traveling along the guide 5, this output face FS may be smooth and continuous, or alternatively may be striated,
a second face FR, opposite the first face FS, constituting a reflection face of the guide 5, which is provided with reflective elements, for example prisms.

For further explanation regarding such a light guide reference may, for example, be made to patent application EP 1 780 463.

The optical unit 1 comprises a hood 15 fixed, by clip-fastening, to the light guide 5 and designed to accept the board 3.

Figure 3:
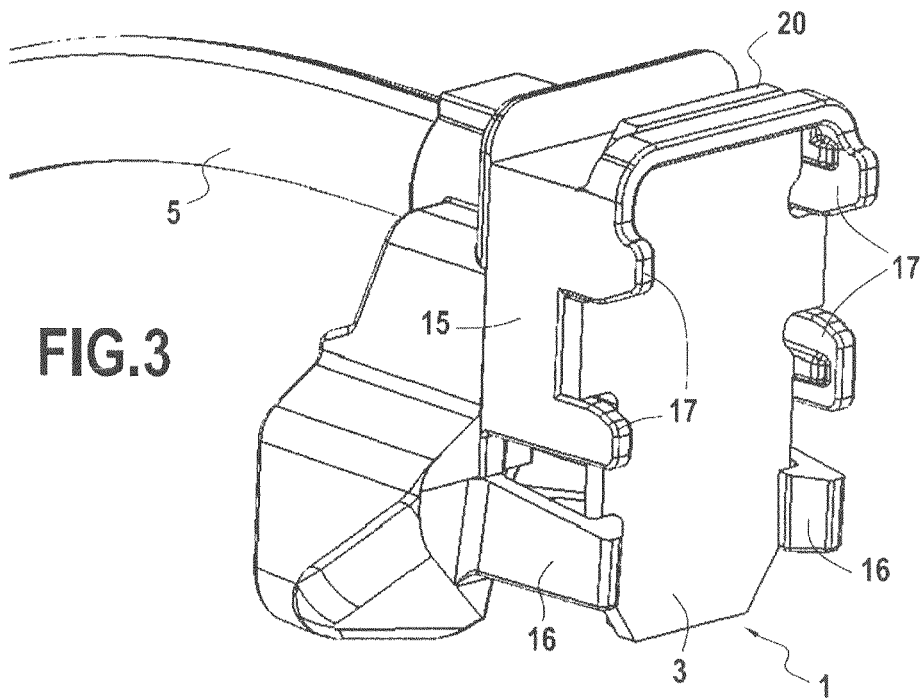

For that purpose, the hood 15 comprises two clip-fastening tabs 16 facing one another and which hold the board 3 in position after fitting (see FIG. 3 in particular).

To allow an even more precise positioning of the light source 2 with respect to the light guide 5 and make the operations of fitting easier, the hood 15 comprises positioning tabs 17 against which the board 3 is held.

The hood 15 comprises a plurality of supports 18, three of them in the example described, on which the board 3 rests (see FIG. 4).

The hood 15 also comprises a slot 19 designed to accept one edge 20 of the board 3, so as to position it and hold it in position.

In the example considered, the axis X of the body 8 of the guide 5 intersects the board 3 more or less at right angles (see FIG. 6).

The board 3 bears an electrical connector 23 connected to the electric circuit of the board, and the hood 15 comprises a housing 24 designed to accept this connector 23, at least partially.

The hood 15 is designed to prevent light from the light guide 5 and/or from the light source 2 from leaking to the outside.

Figure 1:
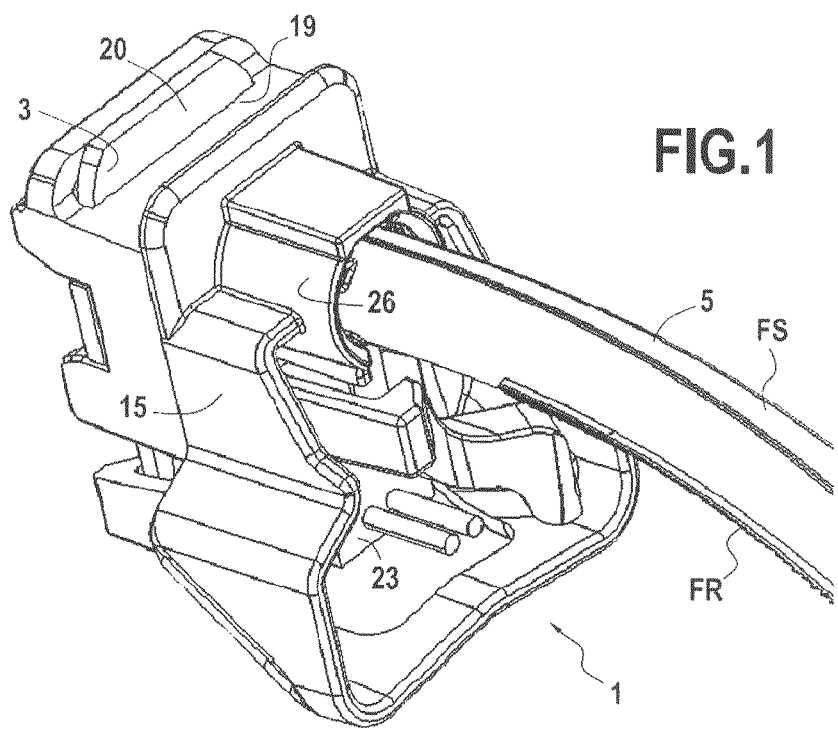
FIGS. 1 to 3 are schematic and partial perspective illustrations of the optical unit according to one embodiment of the invention, from different angles.

To do that, the hood 15 comprises a barrel 26 substantially surrounding an end portion 27 of the light guide 5, the barrel 26 making it possible to prevent light from leaking to the outside, as depicted notably in FIGS. 1 and 6.

The barrel 26, which is substantially cylindrical, of the hood also surrounds the LED 2.

Moreover, the hood 15 has a cavity 29 designed to accept at least an end portion 30 of the transverse tab 9 of the light guide 5 (see notably FIG. 2), to avoid leaks of light coming from the tab 9.

Figure 2:
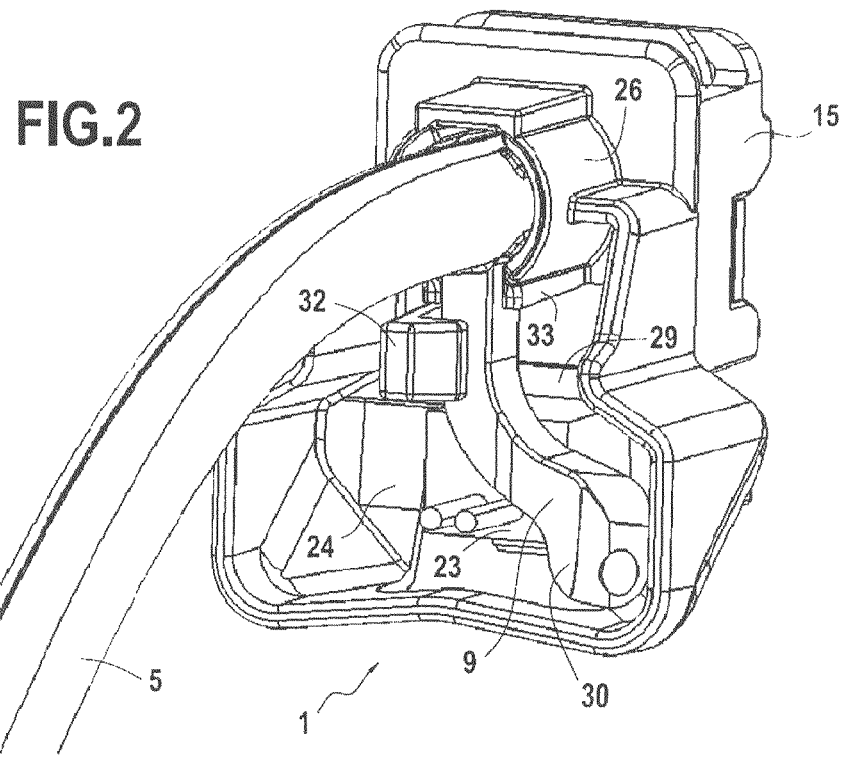

The hood 15 comprises a clip-fastening tab 32 designed to collaborate with the transverse tab 9 of the light guide, this clip-fastening tab 32 running being notably parallel to the aforementioned barrel 26 (see notably FIG. 2).

The barrel 26 comprises a slot 33 for the passage of the transverse tab 9 of the light guide 5.

The hood 15 is made as a single piece, for example out of plastics material.

The board 3 bearing the light source is notably a printed circuit board.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:
1. An optical unit, notably for a motor vehicle signaling and/or lighting device, comprising:

at least one light source comprising at least one light-emitting diode (LED);

at least one board bearing said at least one light source, said at least one board comprising an electric circuit to power said at least one light source; and a light guide made at least partially from a material through which light can travel, said light guide being designed to accept light from said at least one light source and to guide light from said at least one light source;

wherein said at least one board is borne by said light guide;

wherein said light guide comprises a first face and a second face which are oriented generally parallel to a curvilinear axis of said light guide; said first face being an output face for outputting rays of light from said at least one light-emitting diode traveling along said light guide and said second face is generally opposite said first face and constitutes a reflection face of said light guide;

wherein said optical unit is adapted for mounting on the motor vehicle.

2. The optical unit according to claim 1, wherein said at least one board is secured, directly or indirectly, to said light guide by clip-fastening.

3. The optical unit according to claim 2, wherein said optical unit comprises a hood fixed, preferably by clip-fastening, to said light guide and designed to accept said at least one board.

4. The optical unit according to claim 2, wherein said light guide comprises a main body of elongate shape along a predetermined curvilinear axis, and a tab running transversely to a predetermined direction.

5. The optical unit according to claim 2, wherein said light guide comprises two longitudinal ends and each of these ends accepts a light source and a board, and possibly a hood as aforementioned.

6. The optical unit according to claim 1, wherein said optical unit comprises a hood fixed, preferably by clip-fastening, to said light guide and designed to accept said at least one board.

7. The optical unit according to claim 3, wherein said hood is designed to prevent light from said light guide and/or from said at least one light source from leaking to the outside.

8. The optical unit according to claim 7, wherein said hood comprises a barrel at least partially surrounding an end portion of said light guide.

9. The optical unit according to claim 8, wherein said barrel of said hood surrounds said light source.

10. The optical unit according to claim 6, wherein said light guide comprises two longitudinal ends and each of these ends accepts a light source and a board, and possibly a hood as aforementioned.

11. The optical unit according to claim 6, wherein said hood comprises at least one clip-fastening tab designed to collaborate with the transverse tab of said light guide, said at least one clip-fastening tab being notably parallel to the aforementioned barrel.

12. The optical unit according to claim 6, wherein said hood is designed to be fixed to said at least one board by clip-fastening.

13. The optical unit according to claim 12, wherein said hood comprises at least one clip-fastening tab, notably at least two clip-fastening tabs, notably facing one another, to collaborate with said at least one board.

14. The optical unit according to claim 6, wherein said hood comprises at least one positioning tab for said at least one board, preferably at least two positioning tabs notably facing one another.

15. The optical unit according to claim 6, wherein said light guide comprises a main body of elongate shape along a predetermined curvilinear axis, and a tab running transversely to a predetermined direction.

16. The optical unit according to claim 1, wherein said light guide comprises a main body of elongate shape along a predetermined curvilinear axis, and a tab running transversely to a predetermined direction.

17. The optical unit according to claim 1, wherein said light guide comprises two longitudinal ends and each of these ends accepts a light source and a board, and possibly a hood as aforementioned.

18. The lighting and/or signaling device, notably for a motor vehicle, wherein it comprises an optical unit according to claim 1.

19. A method for fixing a light source to a light guide in a motor vehicle lighting and/or signaling device, said method involving the following steps:

fixing the light source to a printed circuit board, fixing said printed circuit board directly or indirectly to one end of the light guide.

20. The method according to claim 19, wherein said method involves the following step:

interposing a hood between the light guide and said printed circuit board.

* * * * *

UNITED STATES PATENT AND TRADEMARK OFFICE
CERTIFICATE OF CORRECTION

| | | |
|---|---|---|
| PATENT NO. | : 9,068,709 B2 | Page 1 of 1 |
| APPLICATION NO. | : 13/979772 | |
| DATED | : June 30, 2015 | |
| INVENTOR(S) | : Baret et al. | |

It is certified that error appears in the above-identified patent and that said Letters Patent is hereby corrected as shown below:

In The Specification

Column 1, line 43, after "Such" insert -- a --.

Column 2, line 2, delete "Secured" and insert -- secured -- therefor.

Signed and Sealed this
Eighth Day of December, 2015

Michelle K. Lee
*Director of the United States Patent and Trademark Office*